United States Patent [19]

Fair

[11] 4,111,808
[45] Sep. 5, 1978

[54] APPARATUS FOR SLUDGE DIGESTION

[76] Inventor: John H. Fair, 1511 Newcastle St., Colorado Springs, Colo. 80907

[21] Appl. No.: 778,793

[22] Filed: Mar. 17, 1977

Related U.S. Application Data

[63] Continuation of Ser. No. 639,756, Dec. 11, 1975, abandoned.

[51] Int. Cl.² ............................................. C02C 3/00
[52] U.S. Cl. .................................... 210/197; 210/209
[58] Field of Search .................. 210/14, 197, 207, 209

[56] References Cited

U.S. PATENT DOCUMENTS

| | | | |
|---|---|---|---|
| 2,506,927 | 5/1950 | Kelly | 210/197 |
| 3,055,502 | 9/1962 | Cunetta | 210/14 |
| 3,194,756 | 7/1965 | Walker | 210/14 |
| 3,242,071 | 3/1966 | Walker | 210/14 |
| 3,997,437 | 12/1976 | Prince et al. | 10/14 |

*Primary Examiner*—Thomas G. Wyse
*Attorney, Agent, or Firm*—Frank P. Cyr

[57] ABSTRACT

Sludge digestion in a digester tank wherein the primary sludge is force fed into a vertically extending updraft tube mounted within the tank. The primary sludge is fed into the updraft tube at a position adjacent to the upper open end thereof whereas the gas lift employed for circulating the contents within the tank is introduced at a position adjacent to the lower end thereof with a portion of the conduit for the feed of the gas lift medium extending vertically within the updraft tube. A plurality of openings are provided in the updraft tube to allow for the flow of some of the digested sludge thereinto when the gases are fed under pressure into the updraft tube. The feed of the gases into the updraft tube not only serves to uplift the primary sludge fed thereinto, but also causes an unbalance in pressure between the contents in the digester tank and the interior of the updraft tube to then induce a flow of digested sludge into the tube and to there mix with the incoming primary sludge to thus seed the same before the combined primary and digested sludge are released within the digester tank.

5 Claims, 3 Drawing Figures

APPARATUS FOR SLUDGE DIGESTION

CROSS REFERENCE TO RELATED APPLICATION

This application is a continuation of application Ser. No. 639,756 filed Dec. 11, 1975 now abandoned.

BACKGROUND OF THE INVENTION

Sludge digester tanks for the treatment of sewage therein have been in existence for some time. However, certain drawbacks have been noted in the equipment employed in the past and one such drawback resides in the fact that no provision has been made to insure the proper seeding of the primary sludge by mixing some of the digested sludge already in the digester tank with the incoming primary sludge.

With the above in mind it is the primary object of the invention to employ an apparatus to insure the seeding of the incoming primary sludge by mixing the same within a confined area with some of the digested sludge prior to the release of the mixture into the digester tank.

Another object of the invention is to provide a structure including an updraft tube having openings formed therein for the flow of digested sludge within the tube and to mix with the primary sludge also fed into the updraft tube prior to the release of the combined mixture into the digester tank.

Another object of the invention is to employ a suitable plastic composition in the formation of the internal parts of the digester tank so as to prevent the formation of corrosion of any of these parts of the tank.

Another object of the invention is to provide a means whereby the gases fed under pressure into the digester tank can be used as a carrier for enzymes, bacterial cultures, or chemicals employed to enhance the digestive process within the tank.

Another object of the invention is to provide a digester tank and parts therein free of any obstruction so as to insure a smooth flow of the contents therein thus avoiding any clogging within the tank which could impede the smooth flow of the sewage undergoing treatment in the tank.

Another object of the invention is to provide a suitable valving arrangement in the conduits leading into the updraft tube in the digester tank so that the amount of feed of the gases as well as the amount of primary sludge fed thereinto may be regulated.

Another object of the invention is to provide a means such as a suitable timing mechanism whereby the opening and closing of the valves in the conduits leading to the updraft tube may be effected on a time basis.

Other objects and advantages of the invention will be apparent from the following description and from the drawings.

DESCRIPTION OF THE PREFERRED EMBODIMENTS

Figure 1:
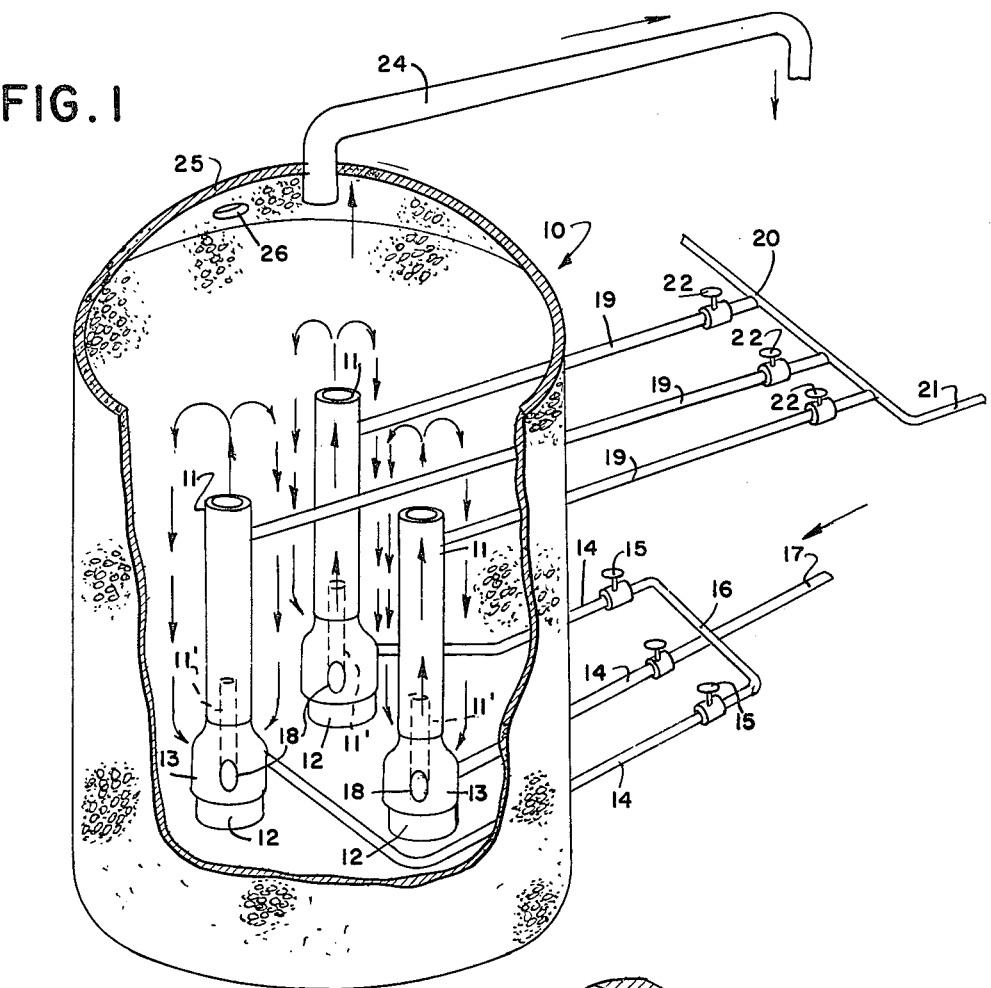
FIG. 1 is a perspective view, with parts broken away, showing one embodiment of the invention.

The following description is detailed so as to enable one to understand the principle of operation of the method and apparatus for effecting the proper seeding of primary sludge within a confined area prior to the release thereof into the interior of the digester tank and is not intended to preclude that purpose of a patent which is to cover each new inventive concept therein, no matter how others may disguise the same by variation in form or addition in form or further improvement.

Referring now to the drawings wherein like reference numerals are employed to designate like parts throughout the several views thereof, reference numeral 10 designates a digester tank which may be of any size in diameter and which may be constructed of any suitable material, such as concrete, metal, or any other suitable material. It should be pointed out, however, that the interior of the tank should be coated or otherwise lined with a suitable non-corrosive material such as polyvinyl chloride or the like non-corrosive material. Of course, it is entirely possible that the entire tank could be constructed from a suitable plastic material or from other known non-corrosive materials.

Figure 2:
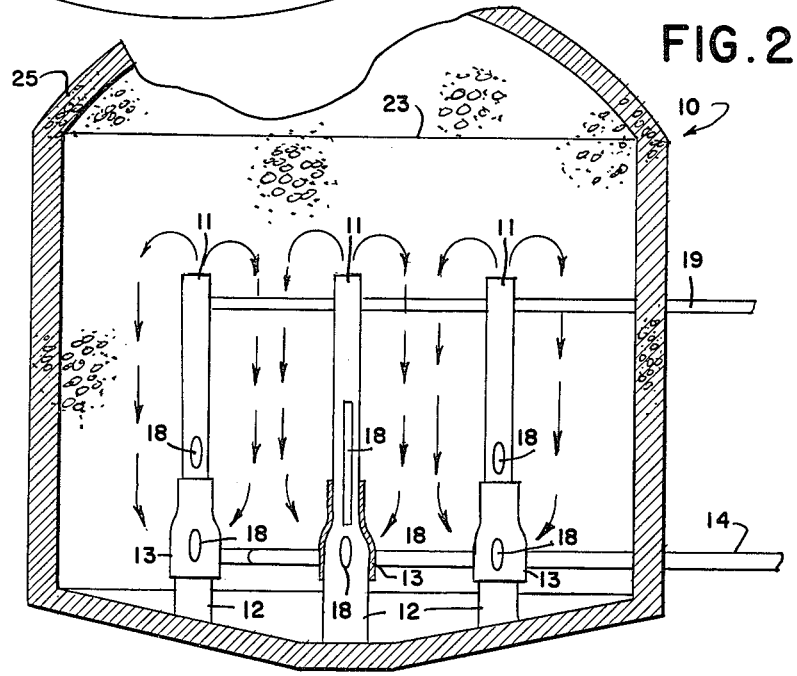
FIG. 2 is a side elevational view, with parts broken away showing the embodiment disclosed in FIG. 1 of the drawings, and, FIG. 3 is a view showing a modification of the invention.

Referring now more particularly to FIGS. 1 and 2 of the drawings, the digester tank is shown as having mounted therein a plurality of vertically extending updraft tubes 11 formed of any suitable material, preferably plastic or other non-corrosive material to prevent the formation of corrosion on these parts of the apparatus. As can be appreciated, as many updraft tubes 11 will be mounted within the digester tank as is necessary to effect a proper digestive process to be carried out within the tank. The updraft tubes 11 are supported on the floor of the tank by means of vertically extending supports 12, again formed of a non-corrosive material or lined or coated with such material to prevent the formation of rust on the supports. The updraft tubes may be bell-shaped at the lower portion thereof as shown by reference numeral 13 which will engage with the upper portion of the supports 12 to form a fluid-tight connection therewith. The upper portion of the updraft tubes 11 are open and are generally disposed below the level of the contents within the digester tank.

A plurality of gas admitting conduits 14 formed of a suitable non-corrosive material extend from a manifold 16 mounted in any manner outside of the tank 10 and each conduit is provided with a valve mechanism 15 which may be hand operated for opening or closing the passage within the conduits and also to direct the gas flowing therethrough to any one of the updraft tubes 11 or to all such updraft tubes. The conduits 14 extend into the digester tank at a position adjacent to the bottom thereof and each conduit is connected to one of the updraft tubes. As shown in dotted lines in FIGS. 1 and 2 of the drawings the conduits extend within the updraft tubes 11 and terminate in a vertically extending section 11'. A gas feed line 17 is connected to the manifold 16 for directing a flow of gas thereinto.

Formed in the lower portion of the updraft tubes 11 are a plurality of openings 18 to permit the flow of some of the digested sludge therethrough in a manner to be described more fully hereinafter. The openings may be of any formation, such as round, oval, elongated slots, etc., the only requirement as to the shape of the openings being that they be free of any obstructions therein which could impede the flow of the digested sludge therethrough. Extending within the upper portion of the digester tank 10 are a plurality of conduits 19 which extend from a manifold 20 to which is connected a primary sludge feed conduit 21. Conduits 19 are formed of a suitable non-corrosive material such as plastic, or the like. Suitable valves 22 are provided in each of conduits 19 to thus enable the operator of the digester tank to regulate and/or direct the flow of primary sludge into any of the updraft tubes 11. As shown more clearly in FIGS. 1 and 2 of the drawings, conduits 19 extend into the upper portion of the updraft tubes 11 so as to permit for the feed of the primary sludge into that portion of the updraft tubes.

Shown in FIGS. 1 and 2 of the drawings is a digester tank designed to operate on an anaerobic principle, that is, no oxygen is fed into the digester tank 10. However, during the processing of sewage in the tank certain gases such as methane and carbon dioxide are given off by the materials undergoing treatment within the tank and these gases are collected in the upper portion of the tank, above the level 23 of the digester contents, and exit through a conduit 24 which extends through the roof 25 of the tank and travel in the direction of the arrows to a suitable compressor (not shown) where the gases are compressed and then directed to the conduits 24 when the digester is in operation. Observation ports 26 are provided in the roof of the tank to thus enable one to inspect the interior of the tank.

Figure 3:
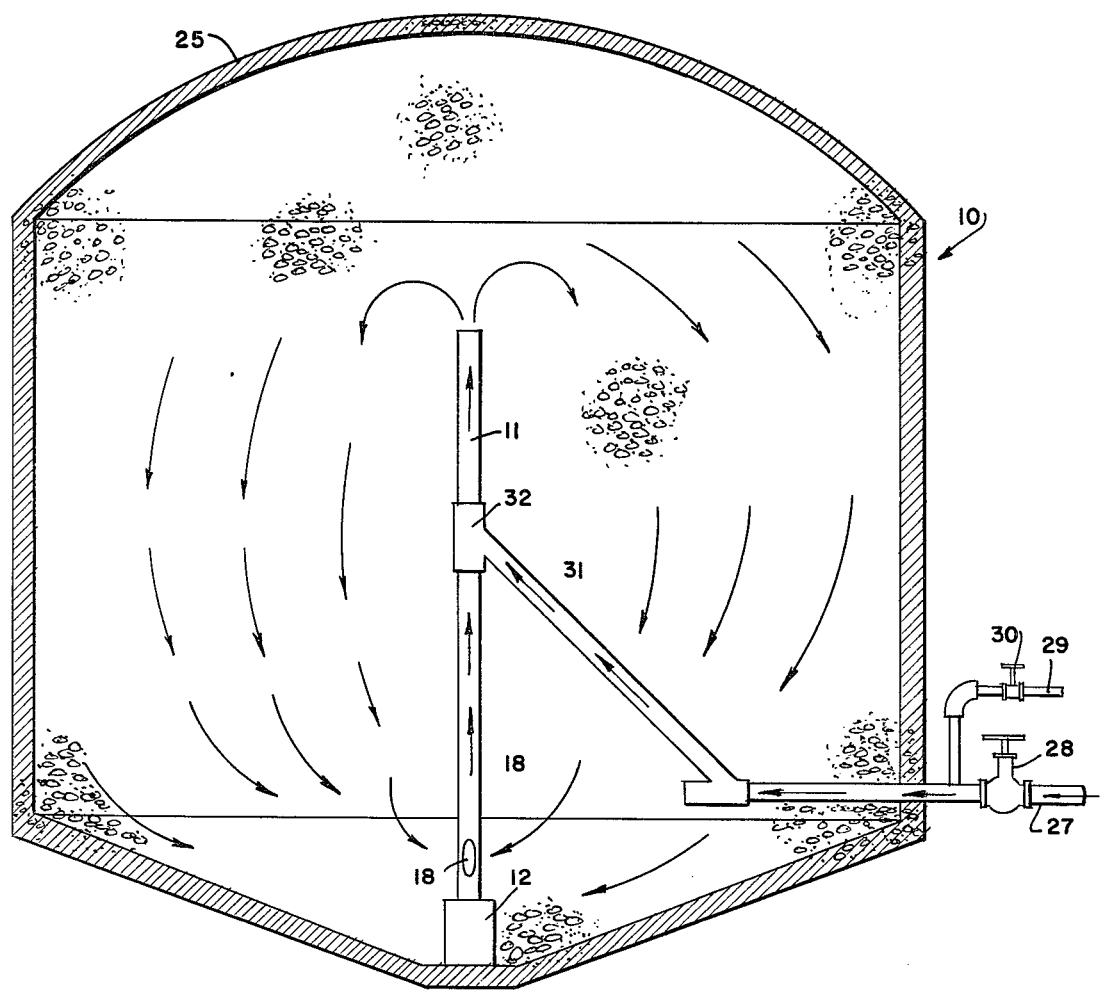

Referring now more particularly to FIG. 3 of the drawings, there is shown therein a modification of the invention. Shown in this modification of the invention is a digester tank 10 constructed along the lines previously described. However, in this form of the invention the primary sludge is admitted into the upper portion of the updraft tube 11 through a conduit 27 having a suitable valve 28 mounted therein and the gases are admitted into conduit 27, through conduit 29 which also has a suitable valve 30 mounted therein. Secured in any known manner to conduit 27 is an upwardly inclined conduit 31 which extends into the updraft tube 11 and is secured thereto in any known manner as by a coupling 32. Again, coupling 32, conduit 31 and as much of the conduit 27 which extends within the digester tank are formed of a suitable non-corrosive material, such as plastic, or the like. The primary sludge is fed into the updraft tube 11 through conduits 27 and 31 and as shown more clearly in FIG. 3 of the drawings, the gas fed through the conduit 29 enters conduit 27 downstream of the valve 28 to thus force the sludge through the conduits 27 and 31 and into the updraft tube 11.

The structure shown in FIG. 3 of the drawings is capable of operation on either an anaerobic or aerobic principle. If the digester operates on an anaerobic principle the gases collected at the top of the tank can be withdrawn therefrom, led to a suitable compressor and then fed into the tank through conduit 29 and 31 as aforesaid. On the other hand, if the digester operates on an aerobic principle, compressed air can be fed into the tank, again through conduits 29 and 31 as aforesaid. As can be appreciated, in the aerobic process additives such as enzymes, bacterial cultures, or chemicals may be injected into the primary sludge by mixing the same either in conduits 27 or 29, prior to the force feed of the sludge into the aforesaid conduits 27 and 31 and into updraft tube 11.

Unlike the introduction of the gases at the lower portion of the updraft tube 11 and the admission of the primary sludge at the upper portion of the updraft tube such as described with reference to FIGS. 1 and 2 of the drawings, the combined charge of primary sludge and gases, with or without additives thereto are force fed into the upper portion of the updraft tube. The feed of the combined charge at that portion of the updraft tube will cause a pressure differential to exist between the digested sludge in the tank and the interior of the updraft tube thus causing some of the digested sludge to be sucked into the updraft tube to there co-mingle with the primary sludge to seed the same before being released in the digester tank.

Operation of the digester is as follows:

When the digester is designed to operate on an anaerobic principle, the gases collected in the upper portion of the tank are fed to a suitable compressor and thence to the gas admitting conduits and into the updraft tubes. The compressed gases entering into the updraft tubes will, as aforesaid, cause a pressure differential to exist within the tank and the tubes which will result in some of the digested sludge to be sucked into the tubes through the aforesaid opening therein and to there comingle with the primary sludge to thus seed the same before being forced outwardly of the tubes and into the digester tank. The seeding of the primary sludge while still within the confines of the updraft tubes will greatly increase the efficiency of the digestive process within the tank. During operation a flow pattern is established within the digester tank as shown generally by the arrows thus causing a continuous recirculation of the contents within the tank. When the digester is designed to operate on an aerobic principle, compressed air is employed in lieu of the collected gases. Otherwise, the digester is designed to operate in the same manner as previously described.

The digester can be designed to operate on a time basis and this can be accomplished by using known timing mechanism to control the operation of the valves located in the conduits which feed either the compressed gases or compressed air as well as the valves located in the conduits which feed the primary sludge into the updraft tubes.

From the above description of the invention it will be apparent that an improved method has been devised to insure the proper seeding of the primary sludge within a confined area before the same is released into the digester tank and the apparatus for accomplishing the same provides for a corrosion free assembly of parts which add materially to the life of such digester tanks.

It will be understood that various changes and modifications can be made in the described construction which provide the characteristics of the invention without departing from the spirit thereof particularly as defined in the following claims.

I claim:

1. A digester tank for digesting sludge therein, said tank including a roof, side walls and a bottom wall, said digester tank having an unobstructed open end updraft tube mounted therein, said updraft tube having openings at the lower end thereof for the flow of partially digested sludge through said updraft tube, a first conduit extending to a position closely adjacent to and terminating at the outside of said tank walls for the feed therethrough of a primary sludge, a second conduit connected to said first conduit outside of said tank side walls, said second conduit extending through the tank side walls and into the said digester tank, a third conduit connected to said second conduit, outside of the said tank side walls, said third conduit connected to said second conduit for the feed thereinto a compressed gaseous medium, said compressed gaseous medium fed into said second conduit forcing said primary sludge through said second conduit and into an upwardly inclined conduit connected to said second conduit interiorly of said tank, said upwardly inclined conduit also connected to said updraft tube at the upper portion thereof, the flow of the compressed gaseous medium and sludge through the aforesaid conduits effecting a circulation of the materials within the digester tank.

2. The structure recited in claim 1 wherein said primary sludge and said gaseous medium are pre-mixed before being fed into the digester tank and are fed into a conduit extending within the said tank which is in communication with said updraft tube.

3. The structure recited in claim 1 wherein valve means are provided in the said first and third conduits to thus enable the regulation of the amount of primary sludge and compressed gaseous medium fed into said digester tank.

4. The structure recited in claim 1 wherein said digester tank, upwardly inclined conduit and updraft tube are coated with a non-corrosive material.

5. The structure recited in claim 1 wherein said compressed gaseous medium is a carrier for enzymes.

* * * * *